March 31, 1936.  C. N. HARRIS  2,035,747
TWO-WAY VALVE GATE
Filed July 20, 1935
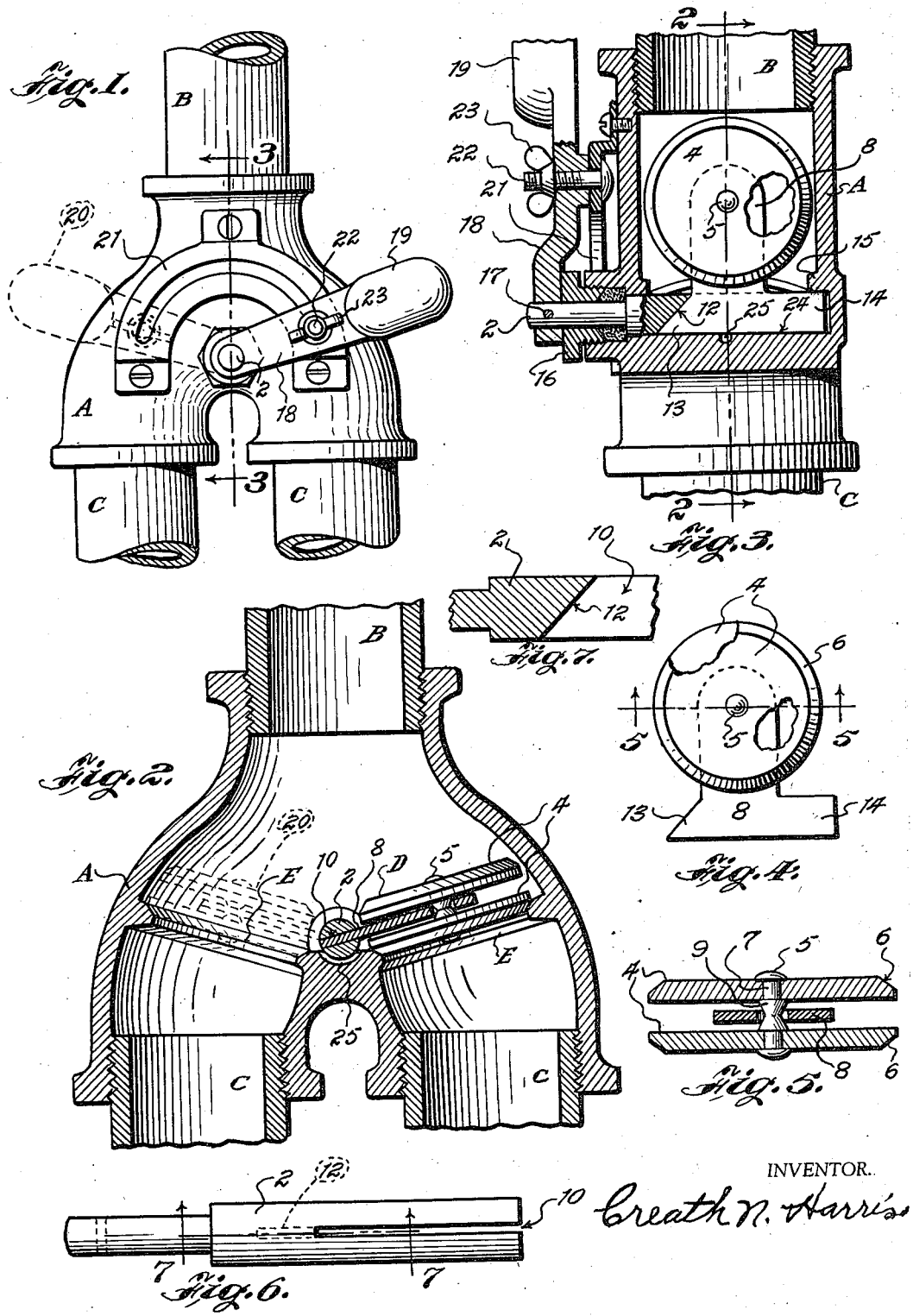
INVENTOR.
Creath N. Harris Patented Mar. 31, 1936

2,035,747

UNITED STATES PATENT OFFICE 2,035,747

TWO-WAY VALVE GATE

Creath N. Harris, Fort Worth, Tex.

Application July 20, 1935, Serial No. 32,441

1 Claim. (Cl. 251—13)

My invention relates to a new and useful improvement in a two-way valve gate, and the general object thereof is the provision of a more positive acting, efficient and substantial construction in a valve for use in the laundry or cleaning business where a fluid, like naphtha, is conducted:

1st. From a filter through a flow line to the washers,

2nd. Returned to the filter through a pickup line after it has become dirty from use, and 3rd. In the discharge line of a centrifugal extractor, to switch the separated, or cleaned, naphtha to storage, and the undesirable fluids, that have been extracted, to the sewer.

Another object of my invention is to provide a two-way valve gate of substantial and efficient construction that can be used in either of the above mentioned lines and, by so doing, reduce the number of valves in the line by half, as would be required if the present standard type of valve is used. Thereby reducing the expense of additional valves and line.

A still further, and more particular, object of my invention, and unique features on which my claims will be based, is to provide a valve with a flexible twin disc shutter construction, that will adjust and lock itself in position when the shaft, on which it is mounted, is in place; and being sufficiently flexible to compensate for wear, and seat properly, although this wear, through long use, is considerable. Also to provide drainage under the valve shaft for any surplus fluid, remaining or accumulating, on the top of the shutter, or along the shaft, when the valve is closed and not in use; and a means for adjusting, and locking, the valve at any desired point in the arc of its travel.

With the above main and other minor, yet important, objects in view, my invention will be readily understood from a perusal of the following detailed description, taken in connection with the accompanying drawing, forming a part of this specification, and in said drawing:

Figure 1 is a front elevation view, showing the weighted arm, that throws the valve, and the locking quadrant for holding the valve at point desired.

Figure 2 is a vertical section taken on line 2—2 of Fig. 3 illustrating my twin shutter gate in a valve casing, as it would appear when seated therein.

Figure 3 is a similar view, but showing gate in a vertical position, for a clearer illustration, and taken on the line 3—3 of Fig. 1.

Figure 4 is a detail view of the valve gate and supporting arm.

Figure 5 is a section taken on line 5—5 of Fig. 4, and gives a clear idea of the twin disc constituting the shutter gate, its supporting arm, and the cone pivot connecting the two discs.

Figure 6 is a plan view of the slotted shaft, and Figure 7 a section of Fig. 6, taken on the line 7—7, and reveals the inclined end of slot designed to receive a similar inclined edge on the supporting arm.

Proceeding in accordance with the drawing, and wherein like parts bearing like indicating numerals and letters, and referring to Fig. 1 A designates the valve-casing, B an intake pipe and C—C discharge pipes.

A shaft 2 extends through the casing wall A, in a transverse direction, and the valve gate D is attached to the shaft by means of the arm 8. Valve seats E on the casing wall are provided to allow the gate D to seat properly when the valve is closed.

Referring now to Figs. 4 to 7, inclusive, I will give a detailed description of my valve gate, the carrying arm, and shaft connection. Twin valve discs 4 are mounted in a parallel position to each other on the opposite ends of a centrally disposed rivet 5. A beveled seat 6 allows the valve to seat properly in the corresponding seats in the valve casing. To secure a positive seating and to compensate for wear, it is desired that these discs be not rigid, but flexibly mounted on the carrying arm. The flexibility desired is secured between the supporting arm 8 and the body 9 of the rivet, by enlarging the hole in the arm and shaping the body of the rivet as a double cone, the apex of the cones being midway between the valve disc. The supporting arm 8 is carried by the shaft 2, and is attached and locked to said shaft in the following manner: a slot 10 extends from the inner end of the shaft to approximately midway of its length, its inner end terminating with an angle or inclined shoulder 12. The arm 8 is provided with a corresponding inclined projection 13, and a protruding lug 14 on its opposite edge. The member 8 is flat and of a corresponding thickness to the width of the slot 10.

To assemble the valve the gate is first placed in the casing, the shaft is then shoved through from the outside, the slot in same straddling the arm 8, until the inclined portion 13 contacts the shoulder 12. It will be noted that the end of the lug 14 will have passed the edge of the bearing 15 and will by this means securely lock the arm in the shaft, when the shaft is fully in place, and held securely by the nut 16 that is part of the packing gland as shown.

On the outer end of the shaft 2, and held by the pin 17 is an arm 18. This arm acts as a lever for throwing the valve, and has a weight 19 on its end. It can travel in an arc to a position indicated by the dotted lines 20. When the valve is closed on either side the weighted end is sufficient to hold it in place, but should it be desired to open the valve and hold it at any particular point in its arc a quadrant 21 is provided, and the bolt 22 is tightened with the wing-nut 23 to hold it securely.

The under part of the shaft 2, and between the end bearings, rests in a partial bearing 24, and extends across the valve transversely; a channel 25 is cut in the bottom of this bearing and connects the two sides of the valve by a clearance under the shaft. This outlet is to drain any surplus liquid that remains on the face of the valve disc or along the side of the shaft when the valve is closed.

While the disclosure shows a practical working embodiment of my invention, it should be understood that changes and modifications may be made, in keeping with the spirit and intent thereof and in the meaning of the appended claim.

What I claim as new, and my invention, is:

A two-way valve gate and control of the class described, comprising twin disc shutters mounted on the opposite ends of a common, centrally disposed rivet, said rivet being shaped to provide a double cone, the apices of said cones being centrally located between said discs, an arm loosely attached to said rivet, said arm being flat and shaped with a protruding inclined portion on one side of its free end to engage a like reverse inclined portion in a slotted shaft, in which said arm is held, a protruding lug oppositely disposed to the inclined portion on said arm, and substantially the same width as the diameter of the shaft, and designed to extend into and lock securely into a bearing of said shaft, thereby locating said arm and valve assembly in position when said shaft is in place in its bearings.

CREATH N. HARRIS.